Feb. 11, 1930. J. J. HOEY 1,746,473
TENTERING MACHINE
Filed Jan. 30, 1929 2 Sheets-Sheet 1
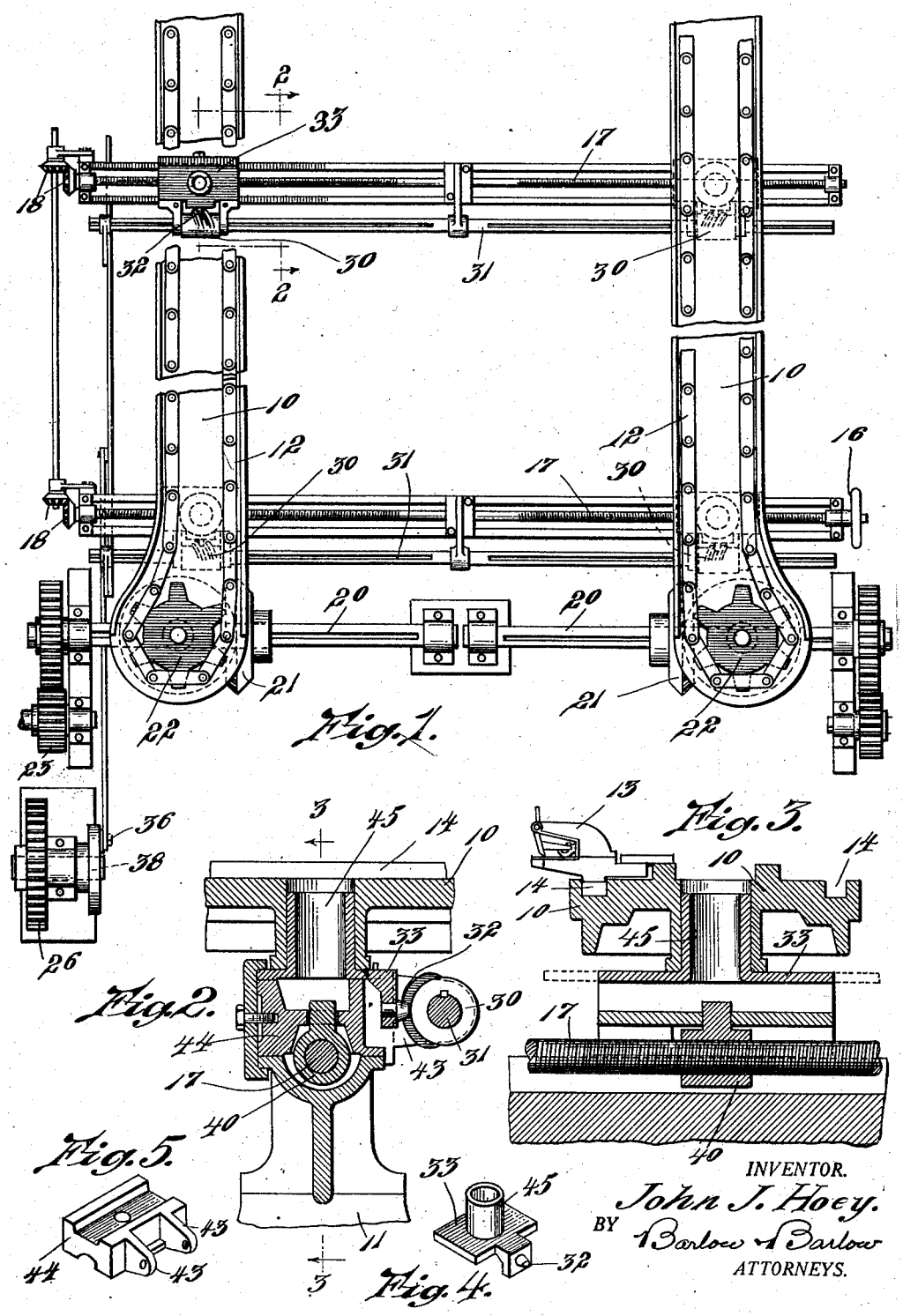
INVENTOR.
John J. Hoey.
BY Barlow & Barlow
ATTORNEYS.

Feb. 11, 1930.  J. J. HOEY  1,746,473
TENTERING MACHINE
Filed Jan. 30, 1929   2 Sheets-Sheet 2
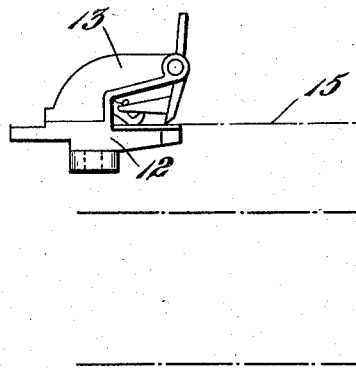
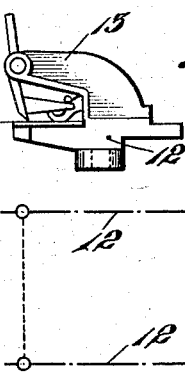
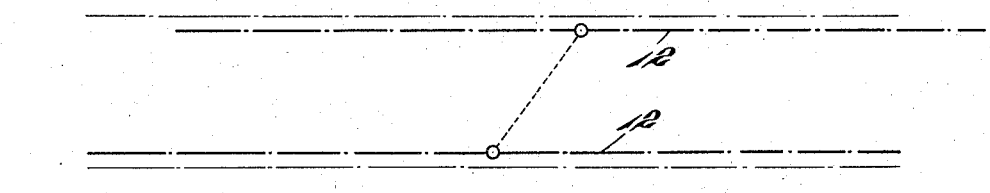
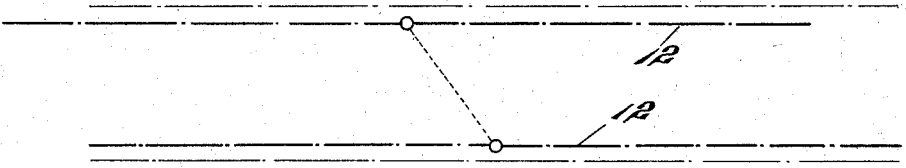
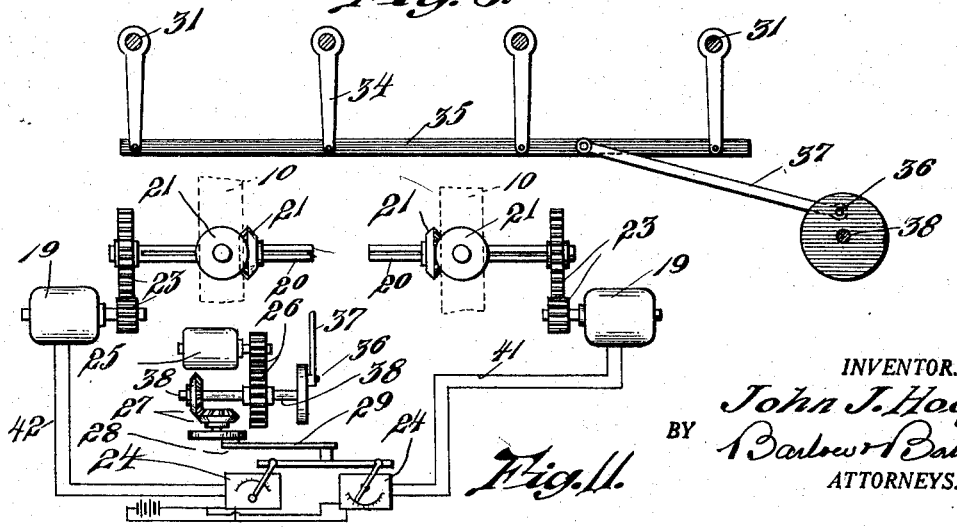
INVENTOR.
John J. Hoey.
BY Barlow & Barlow
ATTORNEYS.

Patented Feb. 11, 1930

1,746,473

UNITED STATES PATENT OFFICE

JOHN JOSEPH HOEY, OF PROVIDENCE, RHODE ISLAND

TENTERING MACHINE

Application filed January 30, 1929. Serial No. 336,266.

This invention relates to an improved construction of tentering machine; and has for its object to provide in such a machine means for driving tenter chains alternately one faster than the other for predetermined distances and simultaneously move the chains laterally toward and from each other to vary the space between them as the distance between gripping points in one chain moves ahead or behind corresponding points in the opposite chain to maintain a constant distance between these points to prevent tearing of the goods being treated.

A further object of the invention is the provision of means for oscillating the chains that is to drive the chains alternately one faster than the other and to provide cooperating means for moving the chain rails laterally toward and from each other and connecting these two driving means to run in time with each other so as to maintain a uniform tension on the goods during this oscillating motion.

With these and other objects in view, the invention consists of certain novel features of construction, as will be more fully described, and particularly pointed out in the appended claims.

In the accompanying drawings:

Fig. 1 is a plan view showing a fragmental portion of my improved tentering machine.

Fig. 2 is a section on line 2—2 of Fig. 1 thru one standard showing a portion of the operating mechanism.

Fig. 3 is a section on line 3—3 of Fig. 2, showing the usual nut and screw for adjusting the working width of the chain rail to accommodate goods of different widths.

Fig. 4 is a perspective view of the sliding saddle plate the movement thru which the compensating adjustment of the rails is obtained.

Fig. 5 is a perspective view of the adjusting screw nut block between the spaced lugs of which is mounted the cam screw which when oscillated imparts a reciprocating movement of the rails toward and from each other thru a sliding movement of the saddle plate and independently of the action of the adjusting screws.

Fig. 6 is a detail illustrating the driving means for reciprocating the cam screws.

Fig. 7 is an end view illustrating the general construction of the tenter chains carrying clips between which the edges of the web are held.

Figs. 8, 9 and 10 illustrate the advancing and retarding movements of one point of one chain relative to that of the opposite chain whereby an oscillating, racking or flexing movement is applied to opposite edges of the web to break up the starch between its fibres and soften the same.

Fig. 11 is a diagrammatic view showing one form of drive whereby the two chains may be alternately driven one faster than the other by separate driving members and the chains alternately moved toward and from each other and in time with the relative oscillating or shifting movement of the chains.

It is found in the practical use of tentering machines when employed to treat some kinds of starched fabrics of advantage to provide means whereby the surface of the fabric may be oscillated or flexed edgeways to break up the starch and soften the goods, and to obtain this effect on the goods while undergoing the usual tentering operation, I have provided means whereby the chains may be alternately driven one faster than the other, and in order to compensate for the distance that one point of chain grip on the web moves ahead of the opposite point of the grip on the web so that a substantially uniform distance between these points may be maintained to prevent tearing or undue stretching of the goods, I have provided oscillating means cooperating with this chain driving mechanism for varying the distance between the chains to compensate for the varying distance of opposite points on the chains. In other words, the lateral distance between the chains is reduced in proportion to the increase of distance between opposite gripping points in the chain as one is moved ahead of the other; and the following is a detailed description of the present embodiment of my invention and showing one means by which these advantageous results may be accomplished.

With reference to the drawings, 10 designates the opposite side rails of a tentering machine, which are supported in the usual standards 11 and on these rails are mounted the usual tenter chains 12 having the usual clips 13 (not shown in Fig. 1), which run in grooves 14 and grip the opposite edges of the web 15 between them.

Ordinarily, these rails are arranged to be manually adjusted laterally thru the hand wheel 16, screws 17, nuts 40 and gears 18 to be moved toward and from each other so as to receive and operate upon goods of different widths. These different chains may be driven from motors 19 thru gears 23, short shafts 20, gears 21 and sprocket wheels 22 at speeds independently of each other and the speeds of these chain driving motors may be regulated by any suitable means, that herein shown being by providing a pair of rheostats 24 connected to the motors thru wires 41 and 42, which rheostats are operated from a motor 25 thru gears 26, beveled gears 27, crank 28 and connector 29 so that as this crank 28 rotates it will move the rheostat arms progressively to increase the resistance of one of these motors and progressively cut out the resistance to the other motor so that they may alternately run faster and slower relative to each other.

In order to apply a transverse movement to the rails 10 to move them toward and from each other in time with the relatively fast and slow movements of the two chains in the course of their travel thru the machine, I have slidably mounted a cam screw 30 between the bearing arms 43 in the saddle carrying block 44 on each end of the splined cross shafts 31 to engage the pin 32 in the slidable saddle plates 33 which plates are mounted to slide laterally on the block 44 and have a trunnion 45 extending into the rail 10 and on the ends of these shafts 31 I have mounted depending arms 34 which are all connected together by a rod 35 and are caused to oscillate back and forth by means of a revolving crank 36 thru the connecting rod 37 whereby as this crank rotates with its shaft these arms 34 are caused to swing back and forth and so rotate the cam screw 32 to act upon their saddle plates 33 to move the rails 10 back and forth toward and from each other to compensate for the distance between given points in the chains as the different chains move ahead or fall behind corresponding points in the opposite chains to prevent the tearing of the goods being treated.

By the use of my improved attachment to a tentering machine, I am enabled to exert a very effective racking, oscillating or shifting movement to the goods to break up the starch between its fibres while undergoing the usual tentering operation.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a tentering machine, chain supports, spaced chains on said supports for gripping opposite edges of the web to be treated, means for alternately advancing one chain faster than the other during their travel, and other means for alternately moving corresponding points on said supports toward and from each other in a plane perpendicular to the direction of travel of the chains to compensate for the distance that one grip point of one chain moves ahead of the corresponding grip point on the opposite chain so that the distance between said points may always be substantially the same to prevent tearing the goods.

2. In a tentering machine, spaced chain rails, a traveling chain on each rail for gripping opposite edges of the web to be treated, means for alternately advancing and retarding said chains relative to each other during their travel along said rails, and other means for alternately moving corresponding points on said rails relatively toward and from each other in a plane perpendicular to the direction of travel of the chains in time with the relative advancement and retarding actions of said chains.

3. In a tentering machine, spaced chain rails, a chain on each rail having clips to grip opposite edges of the web to be tested, means for driving the chains alternately one faster than the other on said rails to cause edgewise vibrations of the web, and means cooperating with the alternating or shifting movement of the chains to compensate for the distance that one point of the chain grip on the web moves ahead of the opposite cooperating grip point on the web so that the distance between said points may always be substantially the same to maintain a substantially uniform tension on the goods.

4. In a tentering machine spaced chain rails, a chain on each rail arranged to grip opposite edges on the web being treated, means for driving the chain alternately one faster than the other on said rails, and means cooperating with said chain driving mechanism for narrowing and widening the space between said chains as the distance between given points in one chain moves ahead or behind corresponding points in the opposite chain.

5. In a tentering machine spaced chain rails, a chain on each rail arranged to grip opposite edges on the web being treated, means for driving the chain alternately one faster than the other on said rails, means for adjusting the working width of the chain rails, and means cooperating with said chain driving mechanism and independent of said width regulating means for narrowing and widening the space between said chains as the distance between given points in one chain moves ahead or behind corresponding points in the opposite chain.

6. In a tentering machine, spaced chain rails, a chain on each rail, each having clips to grip opposite edges on the web being treated, means for advancing the chains alternately one faster than the other on said rails, means including screws and nuts for adjusting the working width of the chain rails, rail carrying slide plates movable independently of said adjustable means, and cam members cooperating with the chain drive mechanism for automatically and alternately moving the opposite chain rails toward and from each other.

In testimony whereof I affix my signature.

JOHN JOSEPH HOEY.